US010527286B2

(12) United States Patent
Prociw et al.

(10) Patent No.: US 10,527,286 B2
(45) Date of Patent: Jan. 7, 2020

(54) STAGED RADIAL AIR SWIRLER WITH RADIAL LIQUID FUEL DISTRIBUTOR

(71) Applicant: Delavan Inc, West Des Moines, IA (US)

(72) Inventors: Lev Alexander Prociw, Johnston, IA (US); Jason A. Ryon, Carlisle, IA (US)

(73) Assignee: DELAVAN, INC, West Des Moines, IA (US)

( * ) Notice: Subject to any disclaimer, the term of this patent is extended or adjusted under 35 U.S.C. 154(b) by 406 days.

(21) Appl. No.: 15/381,609

(22) Filed: Dec. 16, 2016

(65) Prior Publication Data
US 2018/0172272 A1    Jun. 21, 2018

(51) Int. Cl.
*F23R 3/14* (2006.01)
*F23R 3/34* (2006.01)
(Continued)

(52) U.S. Cl.
CPC ............... *F23R 3/14* (2013.01); *F02C 7/22* (2013.01); *F23D 14/24* (2013.01); *F23R 3/346* (2013.01);
(Continued)

(58) Field of Classification Search
CPC .. F23R 3/14; F23R 3/283; F23R 3/286; F23R 3/346; F23R 3/36; F23R 3/10; F23R 3/12; F23R 3/28; F23D 11/107; F23D 11/383; F23D 17/002; F23D 11/104; F23D 14/24; F23D 2204/10; F23C 7/004;
(Continued)

(56) References Cited

U.S. PATENT DOCUMENTS 3,937,011 A * 2/1976 Caruel ................. F23D 11/107
60/737
5,505,045 A * 4/1996 Lee ....................... F23D 11/107
239/424

(Continued)

OTHER PUBLICATIONS

P. Stuttaford et al., "FlameSheet™ Combustor Engine and Rig Validation for Operational and Fuel Flexibility with Low Emissions", Proceedings of ASME Turbo Expo 2016: Turbomachinery Technical Conference and Exposition GY2016, Seoul, South Korea, pp. 1-11.

(Continued)

*Primary Examiner* — Scott J Walthour
*Assistant Examiner* — Todd N Jordan
(74) *Attorney, Agent, or Firm* — Locke Lord LLP; Scott D. Wofsy; Joshua L. Jones

(57) ABSTRACT

A nozzle includes a nozzle body with an inner air passage fed by a first radial swirler and a second radial swirler axially downstream of the first radial swirler. A first fuel circuit is axially between the first and second radial swirlers. A second fuel circuit is axially downstream of the second radial swirler, wherein each of the first fuel circuit and the second fuel circuit extends from a respective fuel circuit inlet to a respective annular fuel circuit outlet. An outer air passage is defined between a fuel circuit outer wall of the second fuel circuit and an outer air passage wall, wherein the outer air passage is a converging non-swirling air passage. An intermediate air passage can be defined between an intermediate wall and the second radial swirler, wherein the intermediate air passage is a converging non-swirling air passage.

14 Claims, 3 Drawing Sheets

(51) Int. Cl.
  *F23D 14/24* (2006.01)
  *F02C 7/22* (2006.01)
  *F23D 11/38* (2006.01)
  *F23D 11/10* (2006.01)
(52) U.S. Cl.
  CPC ........ *F05D 2260/14* (2013.01); *F23D 11/105* (2013.01); *F23D 11/383* (2013.01)
(58) Field of Classification Search
  CPC ............ F23C 2201/30; F23C 2201/301; F23C 7/002; F02C 7/2365; F02C 7/222
  USPC ....... 239/398, 399, 400, 402, 405, 406, 418, 239/422, 423, 424
  See application file for complete search history.

(56) References Cited

U.S. PATENT DOCUMENTS

| | | | |
|---|---|---|---|
| 6,272,840 B1 * | 8/2001 | Crocker | F02C 7/22 239/404 |
| 6,935,116 B2 | 8/2005 | Stuttaford et al. | |
| 7,454,914 B2 * | 11/2008 | Prociw | F23D 11/105 29/889.2 |
| 8,863,524 B2 | 10/2014 | Karlsson et al. | |
| 9,188,063 B2 * | 11/2015 | Prociw | F23R 3/28 |
| 9,222,673 B2 * | 12/2015 | Boardman | F23D 3/14 |
| 2010/0126176 A1 | 5/2010 | Kim | |
| 2012/0186256 A1 | 7/2012 | Dai et al. | |
| 2014/0165578 A1 | 6/2014 | Burd | |
| 2014/0190170 A1 | 7/2014 | Cai et al. | |
| 2014/0338342 A1 * | 11/2014 | Graham | F23R 3/28 60/740 |
| 2016/0084169 A1 | 3/2016 | Stuttaford et al. | |
| 2016/0290649 A1 * | 10/2016 | Prociw | F23R 3/286 |

OTHER PUBLICATIONS

Extended European Search Report, of the European Patent Office, dated May 4, 2018, issued in corresponding European Patent Application No. 17206882.7.

* cited by examiner

STAGED RADIAL AIR SWIRLER WITH RADIAL LIQUID FUEL DISTRIBUTOR

BACKGROUND OF THE INVENTION

1. Field of the Invention

The present disclosure relates to nozzles, and more particularly to nozzles for multiple fuels such as used in industrial gas turbine engines.

2. Description of Related Art

Dual fuel capability does not easily lend itself to low emissions. In conventional dual fuel nozzles, e.g., for industrial gas turbine engines, liquid fuel is usually injected from a pressure atomizer located along the center line of a nozzle. It is difficult in conventional nozzles to get the liquid fuel to the outer reaches of the fuel nozzle, especially in large diameter nozzles.

The conventional techniques have been considered satisfactory for their intended purpose. However, there is an ever present need for improved dual fuel nozzles. This disclosure provides a solution for this problem.

SUMMARY OF THE INVENTION

A nozzle includes a nozzle body defining a longitudinal axis. The nozzle body includes an inner air passage fed by a first radial swirler and a second radial swirler axially downstream of the first radial swirler. A first fuel circuit is axially between the first and second radial swirlers with respect to the longitudinal axis. A second fuel circuit is axially downstream of the second radial swirler with respect to the longitudinal axis, wherein each of the first fuel circuit and the second fuel circuit extends from a respective fuel circuit inlet to a respective annular fuel circuit outlet. An outer air passage is defined between a fuel circuit outer wall of the second fuel circuit and an outer air passage wall, wherein the outer air passage is a converging non-swirling air passage.

The second fuel circuit can be defined between the fuel circuit outer wall of the second fuel circuit and an inner fuel circuit wall of the second fuel circuit, and the first fuel circuit can be defined between a fuel circuit inner wall of the first fuel circuit and an outer fuel circuit wall of the first fuel circuit. At least one of the first and second fuel circuits can include a plurality of helical passages, wherein each helical passage opens tangentially with respect to the respective fuel circuit outlet. The helical passages can define a flow exit angle relative to the longitudinal axis of at least 85°. An ignitor can be located in an upstream wall of the nozzle body, oriented concentrically on the longitudinal axis.

The respective annular fuel circuit outlets of the first and second fuel circuits can be separated from one another by an intermediate wall, wherein an intermediate air passage is defined between the intermediate wall and the second radial swirler, and wherein the intermediate air passage is a converging non-swirling air passage. At least a portion of the fuel circuit inner and outer walls of the first fuel circuit and the fuel circuit inner and outer walls of the second fuel circuit can have a conical shape that converges toward the longitudinal axis.

The fuel circuit inlet of the first fuel circuit can include a plurality of circumferentially spaced apart openings for fluid communication with a fuel manifold, and the fuel circuit inlet of the second fuel circuit can include a plurality of circumferentially spaced apart openings for fluid communication with the fuel manifold. The first radial swirler can include radial swirl vanes circumferentially spaced apart from one another about an annular inner air inlet, wherein the nozzle body includes a plurality of tubes, each connecting the circumferentially spaced apart openings wherein the tubes for both the first and second fuel circuits pass axially through the radial swirl vanes. A first set of the tubes can connect the circumferentially spaced apart openings of the second fuel circuit and can pass axially through the first fuel circuit. A second set of the tubes can connect the circumferentially spaced apart openings of the first fuel circuit and can pass axially through respective vanes of the first radial swirler. Each tube in the first set of tubes can pass through vanes in both the first and second radial swirlers.

The inner air passage, outer air passage, first fuel circuit, and second fuel circuit can be configured for diffusion flame injection without pre-mixing within the nozzle body. The inner air passage can be free from obstructions along the longitudinal axis downstream of the first radial swirler. Each of the first and second fuel circuits can be configured for injection of liquid fuel. The first and second fuel circuits can be configured for staged operation.

In another aspect, a nozzle includes a nozzle body defining a longitudinal axis and including first, second, third and fourth airflow passages and first and second fuel flow circuits, all three of the airflow passages and both of the fuel flow circuits being defined at least in part between pairs of frustoconical walls, the airflow passages and fuel flow circuits being positioned in order of upstream to downstream, as determined by fluid flowing axially through the nozzle, in the order of first airflow channel, first fuel flow circuit, second airflow channel, third airflow channel, second fuel flow circuit and fourth airflow channel, the first and third airflow passages having vanes configured to cause radial swirling of air flowing therethrough, the second and fourth airflow channel being without vanes configured to cause radial swirling of air flowing therethrough.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
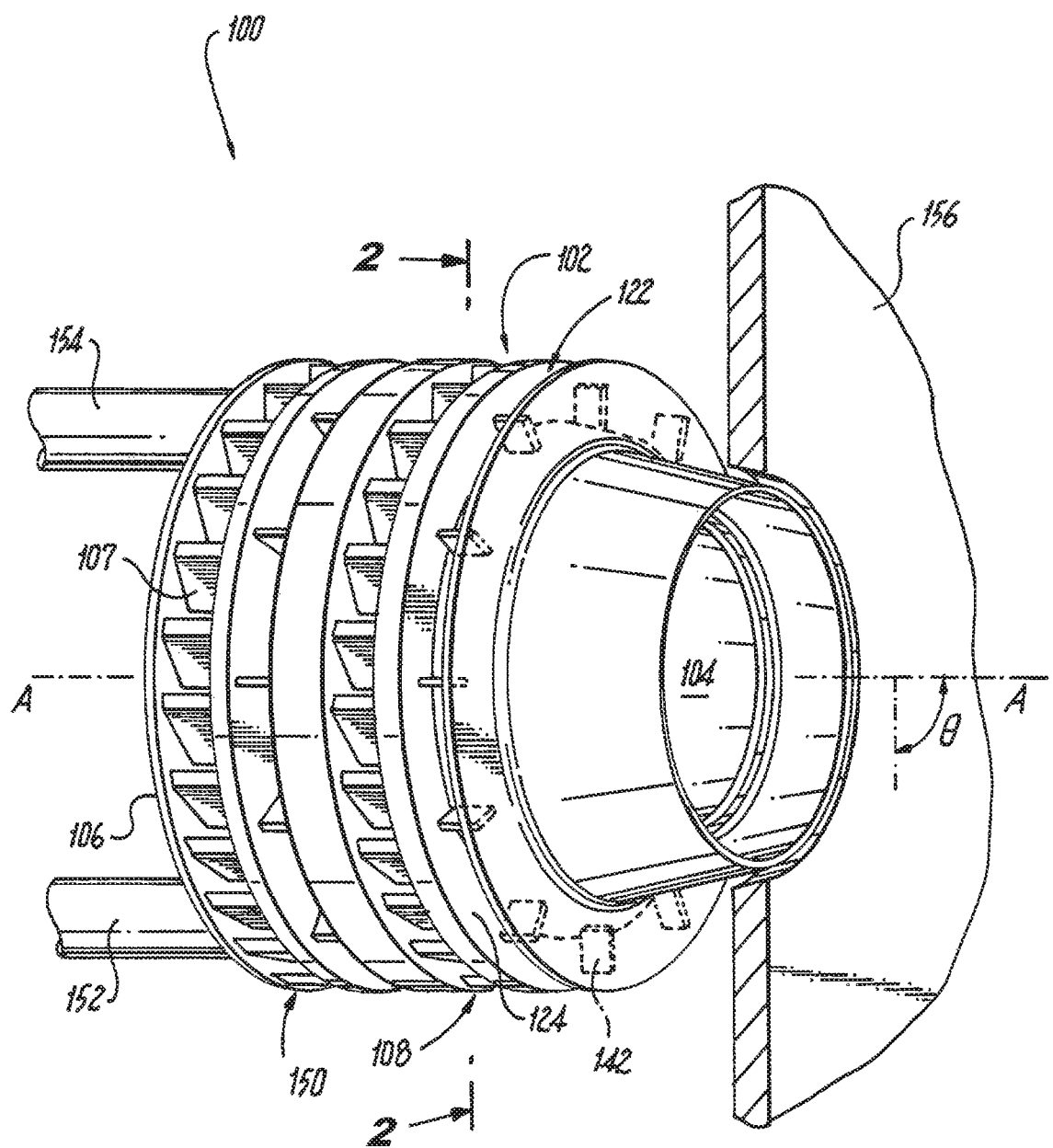
FIG. 1 is a perspective view of an exemplary embodiment of a nozzle constructed in accordance with the present disclosure, showing the radial swirler vanes for the inner air passage and the non-swirling standoffs for the outer air passage.

Reference will now be made to the drawings wherein like reference numerals identify similar structural features or aspects of the subject disclosure. For purposes of explanation and illustration, and not limitation, a partial view of an exemplary embodiment of a nozzle in accordance with the disclosure is shown in FIG. 1 and is designated generally by reference character 100. Other embodiments of nozzles in accordance with the disclosure, or aspects thereof, are provided in FIGS. 2-3, as will be described. The systems and methods described herein can be used to provide staged fuel combustion in gas turbine engines. U.S. patent application Ser. No. 14/674,580 filed Mar. 31, 2015 is incorporated by reference herein in its entirety.

Nozzle 100 includes a nozzle body 102 defining a longitudinal axis A. The nozzle body 102 includes an inner air passage 104 fed by a first radial swirler 106, e.g. defining a first of four air flow passages feeding into the inner air passage 104, and by a second radial swirler axially 108, e.g. defining a third of four air flow passages feeding into the inner air passage 104, downstream of the first radial swirler 106 with respect to longitudinal axis A. A first fuel circuit 110 is axially between the first and second radial swirlers 106 and 108 with respect to the longitudinal axis A. A second fuel circuit 112 is axially downstream of the second radial swirler 108 with respect to the longitudinal axis A. Each of the first fuel circuit 110 and the second fuel circuit 112 extends from a respective fuel circuit inlet 114 and 116 to a respective annular fuel circuit outlet 118 and 120. An outer air passage 122, e.g., defining a fourth of the four air passages feeding into the inner air passage 104, is defined between a fuel circuit outer wall 124 of the second fuel circuit 112 and an outer air passage wall 126. The outer air passage 122 is a converging non-swirling air passage.

The second fuel circuit 112 is defined between the fuel circuit outer wall 124 and an inner fuel circuit wall 128 of the second fuel circuit 112. The first fuel circuit 110 is defined between a fuel circuit inner wall 130 and an outer fuel circuit wall 132. Each of the first and second fuel circuits 110 and 112 includes a plurality of helical passages 134 and 136, wherein each helical passage opens tangentially with respect to the respective fuel circuit outlet 118 and 120. The helical passages 134 and 136 can define a flow exit angle θ relative to the longitudinal axis A of at least 85° (angle θ identified in FIG. 1 offset from the helical passages for comparison directly to axis A for sake of clarity).

The respective annular fuel circuit outlets 118 and 120 of the first and second fuel circuits 110 and 112 are separated from one another by an intermediate wall 138. An intermediate air passage 140, e.g., the third of four air passages feeding into the inner air passage 104, is defined between the intermediate wall 138 and the second radial swirler 108. The intermediate air passage 140 is a converging non-swirling air passage and serves as an outer air passage for first fuel circuit 110. At least a portion of the fuel circuit inner and outer walls 130 and 132 of the first fuel circuit 110 and the fuel circuit inner and outer walls 128 and 124 of the second fuel circuit 112 have a downstream portion with a conical shape, e.g., a portion of the wall is frustoconical, that converges toward the longitudinal axis. The same can be said of intermediate wall 138 and outer air passage wall 126. Spacers 142 connect between fuel circuit outer wall 132 and intermediate wall 138 as well as between outer air passage wall 126 and fuel circuit outer wall 124 and provide space therebetween for outer air passage 122 and intermediate air passage 140, but spacers 142 are not angled for swirl so that air flow through outer air passage 122 and intermediate air passage 140 is not swirled.

The fuel circuit inlet 114 of the first fuel circuit 110 can include one or more circumferentially spaced apart openings 144 for fluid communication with a fuel manifold 146. The fuel circuit inlet 116 of the second fuel circuit 112 can include one or more circumferentially spaced apart openings 148 for fluid communication with the fuel manifold 146. The first radial swirler 106 includes radial swirl vanes 107 circumferentially spaced apart from one another about an annular inner air inlet 150, wherein the nozzle body 120 includes one or more respective tubes 152, each connecting a respective opening 144 to the manifold 146. One or more respective tubes 154 connect each respective opening 148 to the manifold 146. The tubes 152 and 154 for both the first and second fuel circuits 110 and 112 pass axially through the radial swirl vanes 107 of the first radial swirler 106. However, only the one or more tubes 154 pass through the swirl vanes 107 of both the first and second radial swirlers 106 and 108. Tubes 154 connect pass axially through the first fuel circuit 110 and through intermediate air passage 140.

Figure 3:
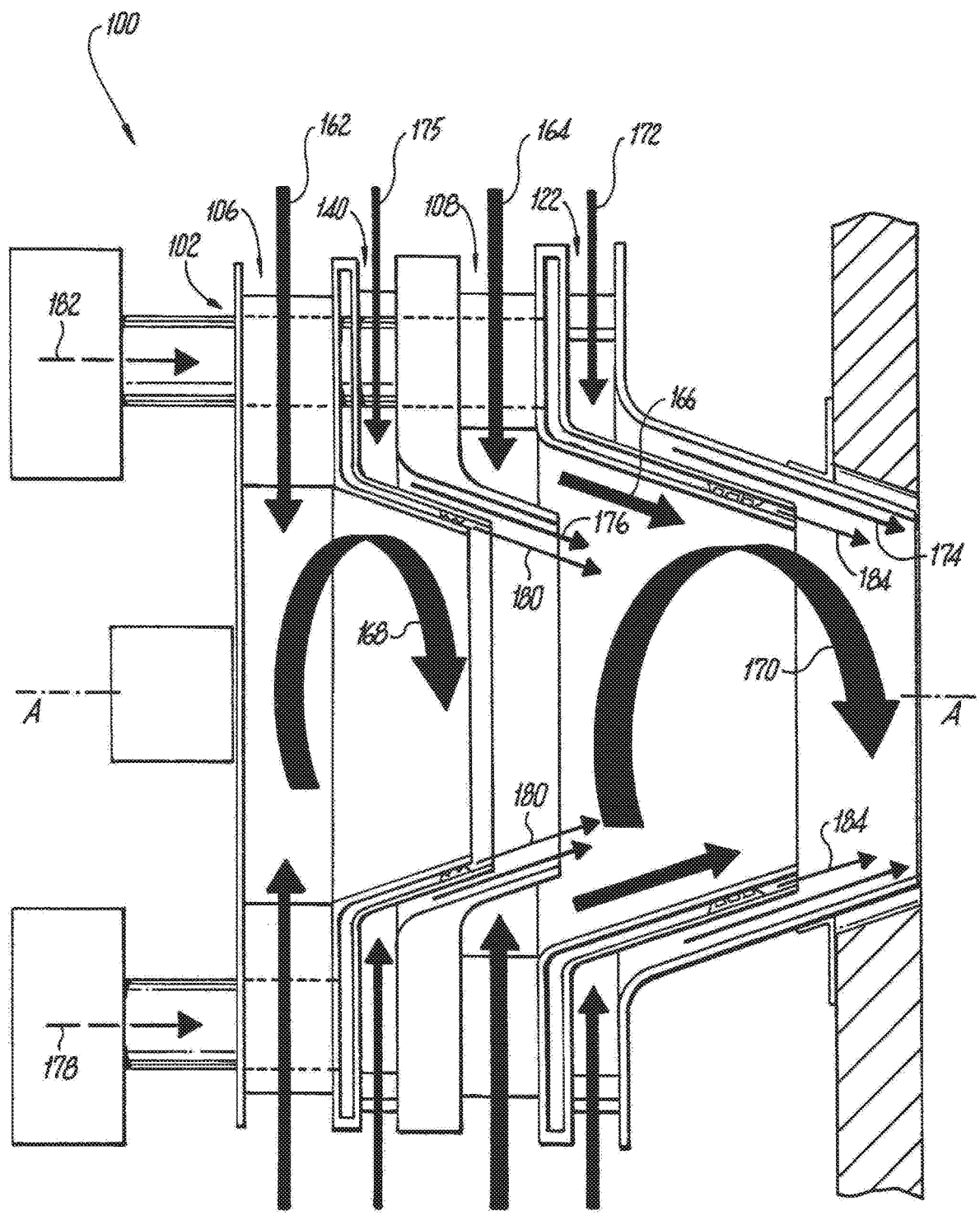
FIG. 3 is a schematic side-elevation cross-sectional view of the nozzle of FIG. 1, showing flow arrows to indicate flow through the air passages and fuel circuits.

The inner air passage 104, outer air passage 122, intermediate air passage 140, first fuel circuit 110, and second fuel circuit 112 are configured for diffusion flame injection. The inner air passage 104 is free from obstructions, such as pilot injectors or the like, along the longitudinal axis A downstream of the fists radial swirler 106. In FIG. 3, arrows 162, 164, 166, 168, and 170 indicate swirling air flow into and through inner air passage 104 from the first and second radial swirlers 106 and 108. Arrows 172 and 174 indicate non-swirling air flow through outer air passage 122 and arrows 175 and 176 indicate non-swirling air flow through intermediate air passage 140. Arrows 178 and 180 indicate fuel flow through first fuel circuit 110, and arrows 182 and 184 indicate fuel flow through second fuel circuit 112. The outer air flow issued from outer air passage 120 and the intermediate air flow through intermediate air passage 140 converges and is not swirled. The inner air flow from inner air passage 104 diverges and is swirled. Air fuel mixing occurs downstream of the nozzle 100 in a non-premixed fashion. The mixing zone created by nozzle 100 permits rapid mixing of fuel and air downstream of nozzle 100.

Since the inlets of both the inner, outer, and intermediate air passages 104, 122 and 140 all open toward the radial direction, all can utilize radial air feeds. This permits less pressure drop in turning the air flow into the nozzle 100, e.g. in a reverse flow combustor. Mixing level can be controlled by adjusting the diameter of the fuel distributors, e.g. the diameter of outlets 118 and 120, to suit the air flow required for a given mixing level.

Figure 2:
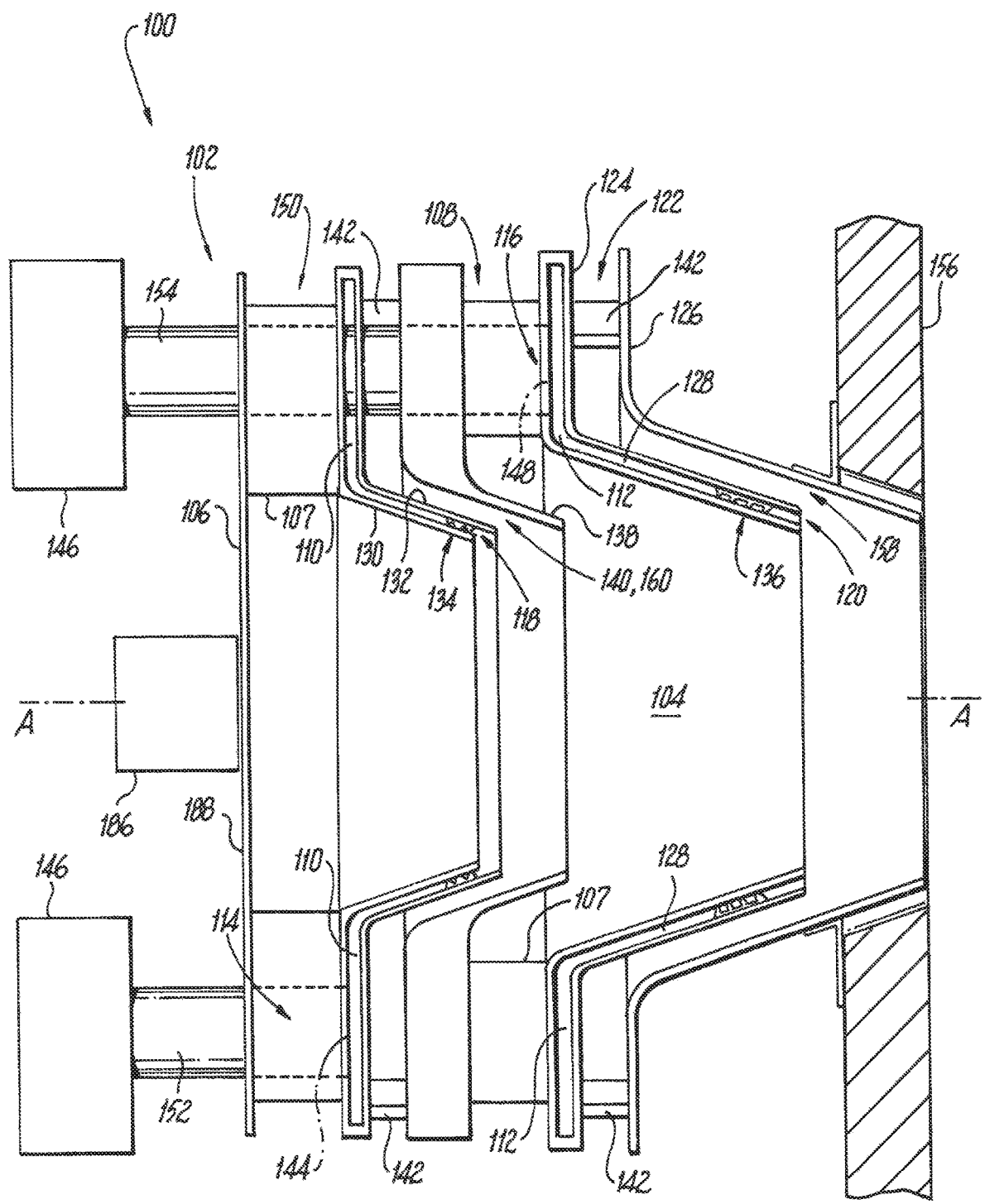
FIG. 2 is a schematic side-elevation cross-sectional view of the nozzle of FIG. 1, showing the first and second fuel circuits.

Each of the first and second fuel circuits 110 and 112 can be configured for injection of liquid fuel, or gaseous fuel, e.g., where both circuits use the same type of fuel. The first and second fuel circuits 110 and 112 can be configured for staged operation, e.g., wherein only fuel circuit 110 is used during low power operation. Manifold 146 of FIG. 1 can control the staging of fuel. For example, start up can be done with only one of the two stages issuing fuel, which can run rich, then later can run leaner and with both stages after startup. The swirling air core of inner air passage 104 can supply between 40% to 50% of the air flow through nozzle 100, which is larger than in conventional nozzles. Overall, the inner diameter of outlet 118 is smaller than that of outlet 120 as shown in FIG. 2. This creates two annular mixing zones. As shown in FIG. 2, an optional ignitor 186 can be included in the upstream wall 188 of nozzle body 102, oriented concentrically along the longitudinal axis A, for start up.

The methods and systems of the present disclosure, as described above and shown in the drawings, provide for staged fuel injection with superior properties including improved mixing and turn down ratios compared to convention nozzles. Embodiments as disclosed herein can be used as retrofit nozzles to replace conventional nozzles in combustor domes. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A nozzle comprising:
a nozzle body defining a longitudinal axis and including:
an inner air passage fed by a first radial swirler and a second radial swirler axially downstream of the first radial swirler;
a first fuel circuit axially between the first and second radial swirlers with respect to the longitudinal axis;
a second fuel circuit axially downstream of the second radial swirler with respect to the longitudinal axis, wherein each of the first fuel circuit and the second fuel circuit extends from a respective fuel circuit inlet to a respective annular fuel circuit outlet; and
an outer air passage defined between a fuel circuit outer wall of the second fuel circuit and an outer air passage wall, wherein the outer air passage is a converging non-swirling air passage, wherein the fuel circuit inlet of the first fuel circuit includes a plurality of circumferentially spaced apart openings for fluid communication with a fuel manifold, and wherein the fuel circuit inlet of the second fuel circuit includes a plurality of circumferentially spaced apart openings for fluid communication with the fuel manifold, wherein the first radial swirler includes radial swirl vanes circumferentially spaced apart from one another about an annular inner air inlet, wherein the nozzle body includes a plurality of tubes, wherein the plurality of tubes comprise a first set of tubes and a second set of tubes, each tube of the first set of tubes connecting a respective circumferentially spaced apart opening of the first fuel circuit to the fuel manifold and each tube of the second set of tubes connecting a respective circumferentially spaced apart opening of the second fuel circuit to the fuel manifold, wherein the plurality of tubes pass axially through the radial swirl vanes of the first radial swirler.

2. The nozzle as recited in claim 1, wherein the inner air passage, outer air passage, first fuel circuit, and second fuel circuit are configured for diffusion flame injection without pre-mixing within the nozzle body.

3. The nozzle as recited in claim 1, wherein the inner air passage is free from obstructions along the longitudinal axis downstream of the first radial swirler.

4. The nozzle as recited in claim 1, wherein each of the first and second fuel circuits is configured for injection of liquid fuel.

5. The nozzle as recited in claim 1, wherein the first and second fuel circuits are configured for staged operation.

6. The nozzle as recited in claim 1, wherein an ignitor is located in an upstream wall of the nozzle body, oriented concentrically on the longitudinal axis.

7. The nozzle as recited in claim 1, wherein at least one of the first and second fuel circuits includes a plurality of helical passages, wherein each helical passage opens tangentially with respect to the respective fuel circuit outlet.

8. The nozzle as recited in claim 7, wherein the helical passages define a flow exit angle relative to the longitudinal axis of at least 85°.

9. The nozzle as recited in claim 1, wherein the second fuel circuit is defined between the fuel circuit outer wall of the second fuel circuit and a fuel circuit inner wall of the second fuel circuit, and wherein the first fuel circuit is defined between a fuel circuit inner wall of the first fuel circuit and a fuel circuit outer wall of the first fuel circuit.

10. The nozzle as recited in claim 9, wherein an intermediate wall is between the first and second fuel circuits, wherein an intermediate air passage is defined between the intermediate wall and the first fuel circuit, wherein the intermediate air passage is a converging non-swirling air passage.

11. The nozzle as recited in claim 9, wherein at least a portion of the fuel circuit inner wall of the first fuel circuit, a portion of the fuel circuit outer wall of the first fuel circuit, a portion of the fuel circuit inner wall of the second fuel circuit and a portion of the fuel circuit outer wall of the second fuel circuit each have a conical shape that converges toward the longitudinal axis.

12. A nozzle comprising:
a nozzle body defining a longitudinal axis and including:
an inner air passage fed by a first radial swirler and a second radial swirler axially downstream of the first radial swirler;
a first fuel circuit axially between the first and second radial swirlers with respect to the longitudinal axis;
a second fuel circuit axially downstream of the second radial swirler with respect to the longitudinal axis, wherein each of the first fuel circuit and the second fuel circuit extends from a respective fuel circuit inlet to a respective annular fuel circuit outlet, wherein the second fuel circuit is defined between a fuel circuit outer wall of the second fuel circuit and a fuel circuit inner wall of the second fuel circuit, and wherein the first fuel circuit is defined between a fuel circuit inner wall of the first fuel circuit and a fuel circuit outer wall of the first fuel circuit; and
an outer air passage defined between the fuel circuit outer wall of the second fuel circuit and an outer air passage wall, wherein the outer air passage is a converging non-swirling air passage, wherein the fuel circuit inlet of the first fuel circuit includes a plurality of circumferentially spaced apart openings for fluid communication with a fuel manifold, and wherein the fuel circuit inlet of the second fuel circuit includes a plurality of circumferentially spaced apart openings for fluid communication with the fuel manifold, wherein a first set of tubes connect the circumferentially spaced apart openings of the second fuel circuit and pass axially through the fuel circuit inner wall of the first fuel circuit, the first fuel circuit, and the fuel circuit outer wall of the first fuel circuit.

13. The nozzle as recited in claim 12, wherein a second set of tubes connect the circumferentially spaced apart openings of the first fuel circuit and pass axially through respective vanes of the first radial swirler.

14. The nozzle as recited in claim 13, wherein each tube in the first set of tubes passes through vanes in both the first and second radial swirlers.

* * * * *